Patented Jan. 27, 1925.

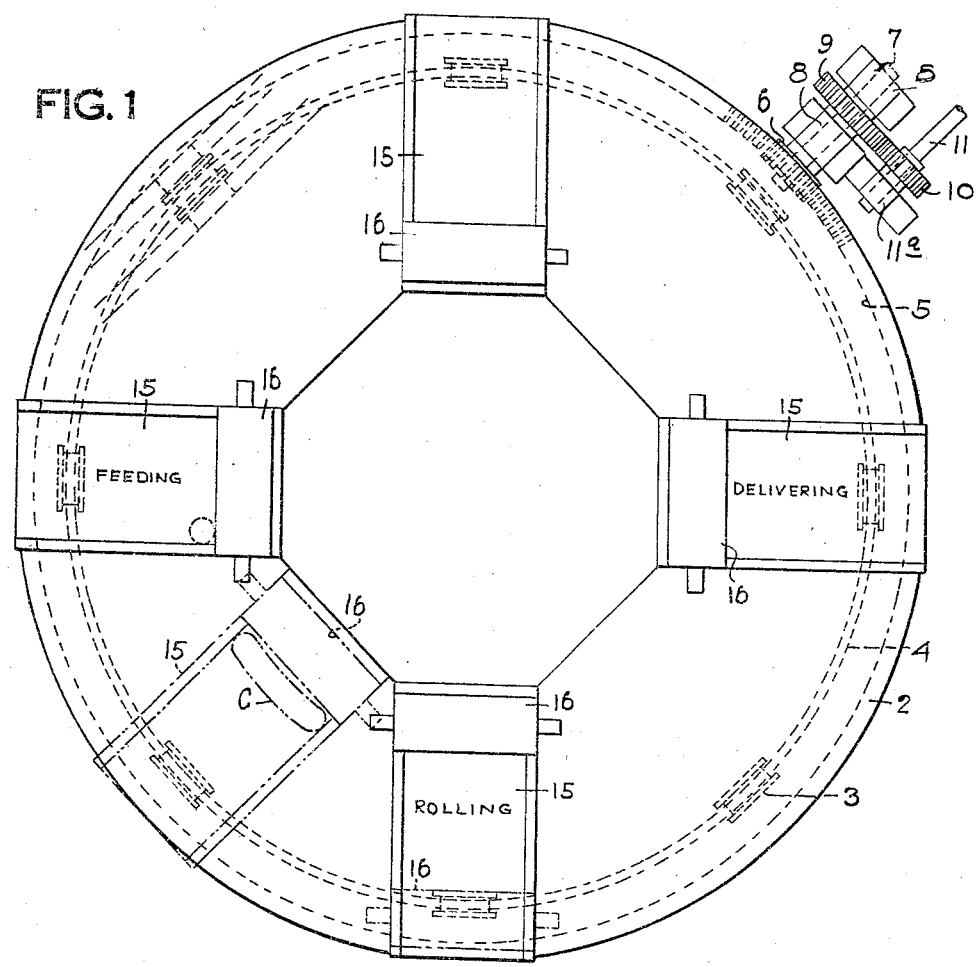

1,524,259

UNITED STATES PATENT OFFICE.

FLOYD V. KESSELMAN, OF BUTLER, PENNSYLVANIA, ASSIGNOR TO FRANK E. TROUTMAN AND CHARLES H. CHRISTIE, BOTH OF BUTLER, PENNSYLVANIA.

METHOD AND APPARATUS FOR MAKING PLATE GLASS.

Application filed July 24, 1922. Serial No. 577,063.

*To all whom it may concern:*

Be it known that I, FLOYD V. KESSELMAN, a citizen of the United States, and resident of Butler, in the county of Butler and State of Pennsylvania, have invented a new and useful Improvement in Methods and Apparatus for Making Plate Glass; and I do hereby declare the following to be a full, clear, and exact description thereof.

My invention relates to the manufacture of plate glass by casting and rolling, and its object is to provide an improved system for casting sheets of high-quality plate glass for use in automobile wind-shields and windows, and for other purposes where the glass is required to have the highest possible quality.

In the usual methods of casting plate glass, in which the glass is placed upon a table in front of a roll and is then rolled into a sheet, the casting table is usually several feet long and wide, and products a correspondingly large sheet. When small sheets are required it is necessary to cut this large sheet into sections, thus adding to the cost of the product through increased labor and breakage. Much of the flat glass that is now made in small sizes is therefore produced by drawing methods, but, although methods of glass-drawing have been greatly improved in recent years, the drawn product is still not as perfect as the best quality of plate glass.

According to my present invention I cast flat glass by providing roll tables corresponding in size to the sheets to be cast, and I deposit the molten glass upon the roll-table by means of a glass feeder which operates intermittently in much the same manner as the gob-feeding devices employed in the manufacture of bottles and other hollow glassware Such gob-feeding devices, as is well known in the bottle-manufacturing art, discharge the glass in a succession of pulsations usually separated by restricted necks or threads which are separated by means of suitable shears. Such gobs are usually elongated vertically. In order to deposit such a gob or gather of glass upon a horizontal casting table it is necessary to move either the table or the feeding outlet during the discharge of the gather. It is more convenient to move the table than the feeding outlet, and I therefore provide means for bringing the small casting tables in succession beneath the outlet of the glass feeder, and for causing each table to move beneath the feeder while the glass is being discharged, so as to lay the glass in front of the flattening rolls.

In the specific embodiment of my invention selected for illustration in the accompanying drawing, I provide a circular platform carrying a suitable number of individual roll tables and mounted for rotation upon a circular track. The parts are so proportioned that when each table is brought beneath the outlet of the glass feeder the glass falls upon the table immediately in front of the roll and the platform is rotated at such a speed as to deposit the discharged glass evenly in front of the roll. The glass is rolled upon the tables and removed therefrom while the tables are being carried with the platform, so that the operation is made practically continuous.

In the drawing, Fig. 1 is a plan view showing the essential parts of a casting machine constructed in accordance with my invention; and Fig. 2 is a side elevational view of the same apparatus, the glass feeder being shown in section.

Referring to the drawing, the numeral 2 indicates a circular platform provided with wheels 3 running upon a circular track 4. Under the edge of the table 2 is a rack 5 which meshes with a gear wheel 6 carried by a shaft 7 which is mounted in stationary bearings 8 and carries a gear wheel 9 meshing with a pinion 10 on a drive shaft 11, one end of which, as shown, is mounted in a bearing 11ª, and which is connected to any suitable source of power, not shown.

Mounted on the platform 2 are a number of roll tables 15 each provided with the usual roll 16, and so arranged that the rolls move radially with respect to the axis of the platform 2. Four such roll tables are shown on the drawing, but this number may obviously be increased or decreased, as may be found convenient.

Above the platform 2, and at one side thereof, is a glass feeder which may be of any type capable of delivering glass in a series of pulsations or gobs. The feeder shown on the drawing consists of a receptacle 20 which may be supplied with glass from a tank furnace or other suitable source, and which is provided with a downwardly opening discharge outlet 21 above which a plunger 22 is arranged to reciprocate vertically. A pair of shears, indicated diagramatically at 23, reciprocate below the glass outlet 21 and sever the glass after each mass is delivered, the glass immediately opposite to the shears being at this time preferably reduced in diameter by the upward movement of the plunger 22. It will be understood that the details of the glass-feeding apparatus herein shown form no part of my invention, and that my invention may be carried out by means of any other well known or desired form of feeder operating to deliver the glass in gobs or gathers.

In the operation of the apparatus described above, the platform 2 is rotated by means of the power-driven gearing to bring the tables 15 successively beneath the outlet 21 of the glass feeder. This rotation of the tables may be continuous, or if desired may be intermittent, the main requirement being that each table shall be brought beneath the glass outlet at the proper time to receive its charge of glass. Whether the platfrom rotates intermittently or continuously, it must of course be in motion while the glass is being received. The glass first issues from the outlet 21 with a rounded leading end, and by proper manipulation of the plunger 22, according to methods well known in the gob feeding art, the glass is kept substantially uniform in diameter as it issues from the outlet. This depending gather of glass is received upon the table 15 which, at the time, is beneath the glass feeder, in the manner shown in Fig. 2, where a gather A is in process of being received on one of the tables 15 and is about to be cut off by the shears 23 at the reduced or necked-in portion B. When the glass is thus cut off the portion which is still suspended at the time of severance falls upon the table, producing an even mass or welt C immediately in front of the roll 16. The mass of glass shown at C has a slight curvature concentric with the axis of the platfrom 2, but as the platform is large in comparison with the size of the roll tables, this curvature does not materially affect the shape of the finished plates.

As shown in Fig. 1, the glass is deposited on the roll-tables successively at the point marked " Feeding " and passes from this position through the dotted line position, where the mass C is shown upon the table, to the position marked " Rolling," where the roll 16 is moved to and fro on the table 15, thus forming the glass C into a sheet. This sheet may be removed at the point marked " Delivering " or at any other suitable point between the rolling position and the feeding position.

The term " plate glass " as used herein, includes any flat glass article, as distinguished from hollow ware, whether the plates are ground and polished or not. While the method and apparatus described above are especially designed for use in making small plates, that is to say, plates up to about 32 inches by 48 inches in size, I do not wish to impose any definite limits upon the size of plate that may be cast in this way. Neither do I wish to be limited to the exact details of construction herein shown and described, since these may be variously modified within the scope of the appended claims.

I claim as my invention:

1. The method of making flat glass that comprises delivering molten glass through a downwardly opening outlet in a succession of gobs or gathers, moving a series of casting tables in succession beneath said outlet through an annular path to receive said gobs thereon, and rolling said gobs into plates on said tables.

2. Apparatus for casting flat glass that comprises a container for molten glass having a downwardly opening outlet, a plurality of casting tables, means for moving said tables successively beneath said outlet, through an annular path, means for discharging gobs or gathers of glass through said outlet upon said tables, and means for rolling said gobs into plates upon said tables.

3. Apparatus for making flat glass comprising a tank furnace, a gob feeder for delivering glass from said furnace, and means for receiving gobs of glass from said feeder and for forming said gobs into plates, comprising tables each movable through an annular path and provided with a roll positioned adjacent to the stream of glass when the same is being deposited on the table.

4. Apparatus for making flat glass comprising a rotatable support and a plurality of casting tables carried by said support and arranged to move continuously in succession beneath said feeder when said support is rotated, and a roll for each table arranged parallel and adjacent to the line of deposit of the glass on the table.

5. Apparatus for making flat glass comprising a tank furnace, a gob feeder for delivering glass from said furnace, a rotatable support, a plurality of casting tables carried by said support with their longitudinal center lines disposed radially with respect to said support, and means for rotating said support to move said tables in succession beneath said feeder.

6. Apparatus for making flat glass comprising a tank furnace, a gob feeder for delivering glass from said furnace, a rotatable support, a plurality of casting tables carried by said support with their longitudinal center lines disposed radially with respect to said support, transverse rolls carried by said tables, and means for rotating said support to move said tables in succession beneath said feeder and to receive gobs of glass from said feeder in front of said rolls.

7. Apparatus for making flat glass comprising a tank furnace, a gob feeder for delivering glass from said furnace, a circular track below said feeder, a rotatable platform having wheels mounted on said track, a circular rack carried by said platform, power-driven means for engaging said rack to rotate said platform, and a plurality of casting tables carried by said platform and adapted to move successively beneath said feeder when said platform is rotated.

8. Apparatus for making flat glass comprising a tank furnace, a gob feeder for delivering glass from said furnace, a circular track below said feeder, a rotatable platform having wheels mounted on said track, a circular rack carried by said platform, power-driven means for engaging said rack to rotate said platform, and a plurality of casting tables carried by said platform and having their longitudinal center lines radially with respect to said platform, the said tables carrying transverse rolls and being adapted to move successively beneath said feeder when said table is rotated, and to receive gobs of glass from said feeder in front of said rolls.

In testimony whereof I the said FLOYD V. KESSELMAN have hereunto set my hand.

FLOYD V. KESSELMAN.